US012647521B1

(12) United States Patent
Majid et al.

(10) Patent No.: US 12,647,521 B1
(45) Date of Patent: Jun. 2, 2026

(54) MESSAGE-SPEED EVALUATION OF EVENT-BASED CONTRACT DATA

(71) Applicant: MESSAGEBIRD BIDCO B.V., Amsterdam (NL)

(72) Inventors: Dana Majid, Amsterdam (NL); Robert Vis, Amsterdam (NL)

(73) Assignee: Bird Bidco B.V., Amsterdam (NL)

( * ) Notice: Subject to any disclaimer, the term of this patent is extended or adjusted under 35 U.S.C. 154(b) by 336 days.

(21) Appl. No.: 18/458,347

(22) Filed: Aug. 30, 2023

(51) Int. Cl.
*H04M 15/00* (2024.01)
*H04W 4/14* (2009.01)

(52) U.S. Cl.
CPC ......... *H04M 15/8221* (2013.01); *H04W 4/14* (2013.01)

(58) Field of Classification Search
CPC ............................ H04M 15/8221; H04W 4/14
USPC ......................................................... 455/406
See application file for complete search history.

(56) References Cited

U.S. PATENT DOCUMENTS

2007/0049245 A1    3/2007  Lipman
2008/0273523 A1    11/2008  Menditto et al.

2010/0228652 A1    9/2010   Koraichi et al.
2020/0272631 A1    8/2020   Nash et al.
2021/0377193 A1*  12/2021  Violier .................... H04L 51/56
2023/0262427 A1*   8/2023   Mumick ................ H04L 51/10
                                                                      455/466

* cited by examiner

*Primary Examiner* — Huy C Ho

(74) *Attorney, Agent, or Firm* — Baker Botts L.L.P.

(57) ABSTRACT

A computer-implemented method, comprising using a message application processor, programmatically receiving a first request to determine a fee associated with sending a digital electronic message using any one of a plurality of different communication channels, the request comprising at least a product identifier and an organization identifier; in response to the request, the message application processor executing: extracting the product identifier and the organization identifier from the message; based on the organization identifier, retrieving from digital data storage one or more configuration values that are associated with an organization corresponding to the organization identifier; the message application processor obtaining a time value corresponding to a then-current time; the message application processor querying the digital data storage, based on the product identifier and the time value, an applicable pricing for the message and corresponding to the product identifier and the time value; the message application processor causing digitally creating and storing a fee charge record based on the applicable pricing.

28 Claims, 7 Drawing Sheets

Fig. 1C

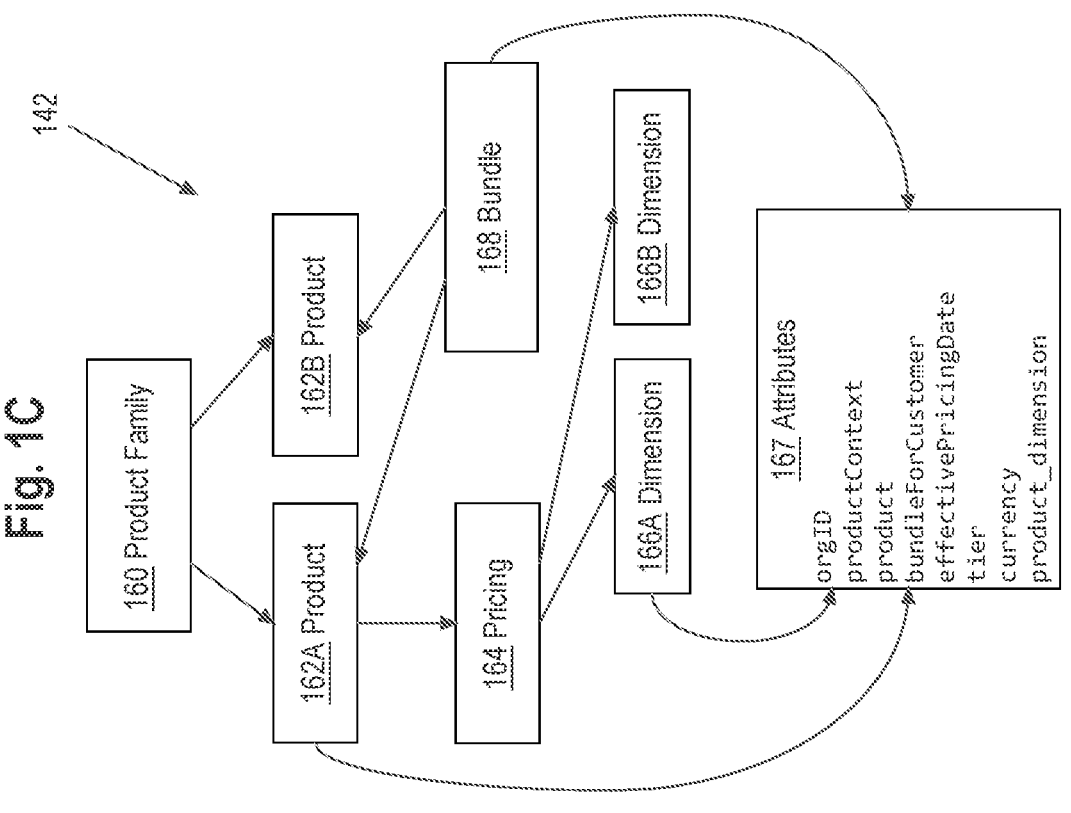

142

160 Product Family

162A Product

162B Product

168 Bundle

164 Pricing

166A Dimension

166B Dimension

167 Attributes orgID
productContext
product
bundleForCustomer
effectivePricingDate
tier
currency
product_dimension

Fig. 1B

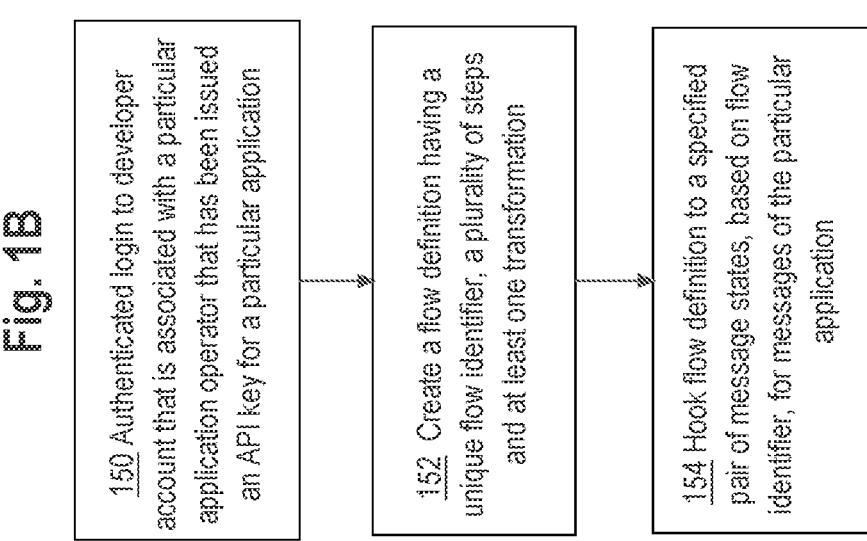

150 Authenticated login to developer account that is associated with a particular application operator that has been issued an API key for a particular application 152 Create a flow definition having a unique flow identifier, a plurality of steps and at least one transformation 154 Hook flow definition to a specified pair of message states, based on flow identifier, for messages of the particular application

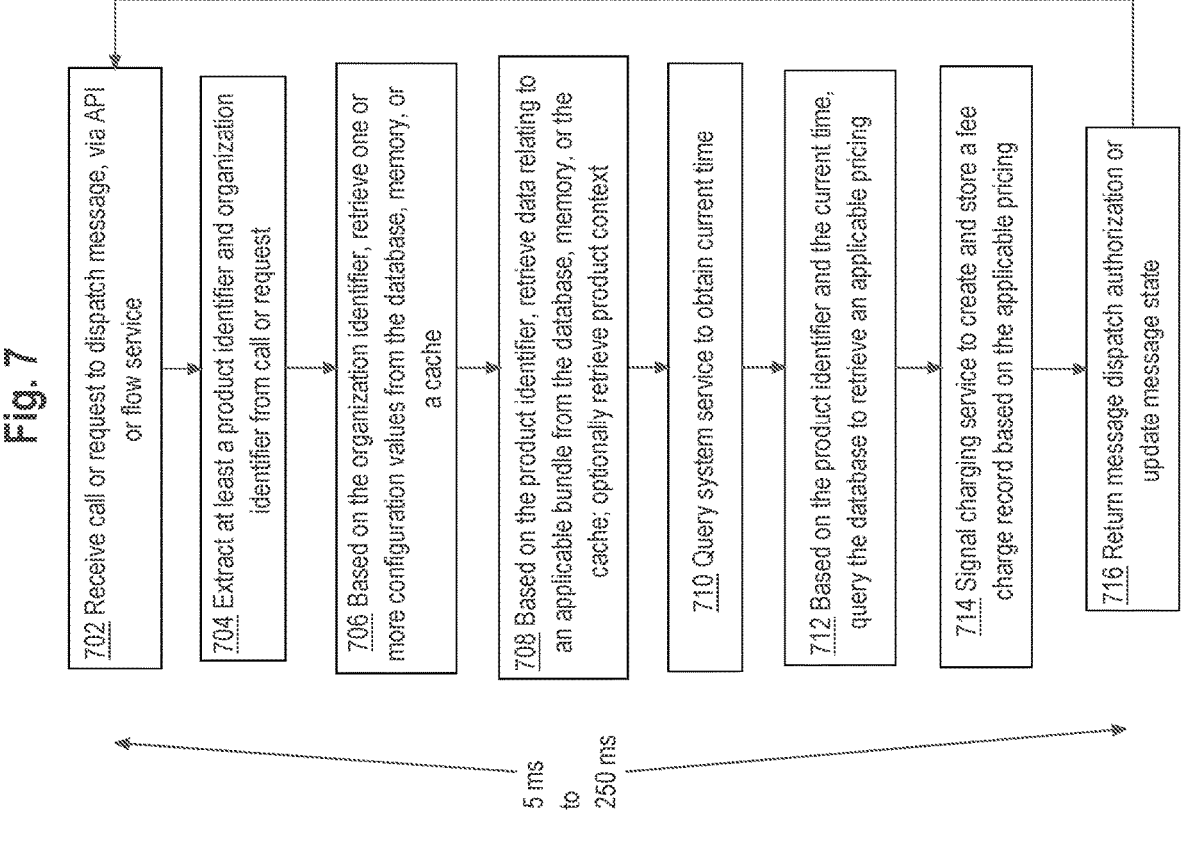

Fig. 7

702 Receive call or request to dispatch message, via API or flow service

704 Extract at least a product identifier and organization identifier from call or request 706 Based on the organization identifier, retrieve one or more configuration values from the database, memory, or a cache 708 Based on the product identifier, retrieve data relating to an applicable bundle from the database, memory, or the cache; optionally retrieve product context 710 Query system service to obtain current time 712 Based on the product identifier and the current time, query the database to retrieve an applicable pricing 714 Signal charging service to create and store a fee charge record based on the applicable pricing 716 Return message dispatch authorization or update message state 5 ms to 250 ms

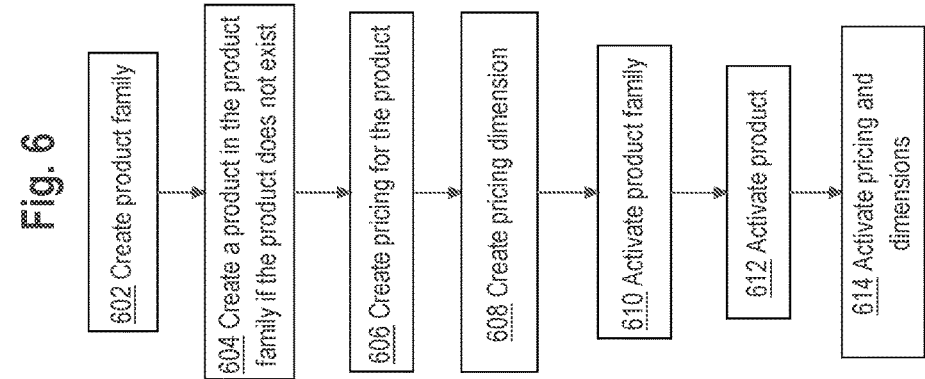

Fig. 6

602 Create product family

604 Create a product in the product family if the product does not exist

606 Create pricing for the product

608 Create pricing dimension

610 Activate product family

612 Activate product

614 Activate pricing and dimensions

MESSAGE-SPEED EVALUATION OF EVENT-BASED CONTRACT DATA

TECHNICAL FIELD

One technical field of the present disclosure is large-scale distributed computer systems programmed to operate as short message transmission systems. Another technical field is the high-speed reading and evaluation of complex data structures for programmatic control of channels of communication in large-scale messaging systems.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Large-scale distributed computer systems have entered wide use to support the transmission of short text messages, instant message services, verification messages, and other applications. With these systems, enterprises can define flows of messages via Short Message Service (SMS), MMS, WHATSAPP, other instant messengers, and other communication channels such as chat services. Flows can specify conversations across multiple different communication channels, verification via two-factor authentication, or other services or applications. The core operating software of the messaging systems, which implement state machines to define transitions from one message state to another, can facilitate large numbers of flows for many enterprises at once.

These systems and their core operating software offer tremendous flexibility and scalability. Owners and operators of the systems normally charge a fee to brands, manufacturers, service providers, institutions, and other enterprises that use the systems to send messages at high speed and large scale. Messaging service providers seek to structure fees based on products, product families, organization, context, date, amount of usage, currency, and other factors. However, when supporting the transmission of billions of messages, determining the correct fee or price to charge or impose on a sending enterprise is difficult because, in effect, it requires reading and evaluating complex contract terms within milliseconds-a time beyond the capacity of human work.

Therefore, the owners and operators of messaging infrastructure systems have a long-standing, unmet need for improved, technically efficient, fast, and reliable means to define fee, price, or contract terms and ensure that the terms can be nearly instantly evaluated and applied to particular messages or messaging campaigns.

SUMMARY

The appended claims may serve as a summary of the invention.

BRIEF DESCRIPTION OF THE DRAWINGS

In the drawings:

FIG. 1B illustrates a process of creating a flow definition.

FIG. 1C illustrates an example data schema that can be used to structure tables, table relationships, rows, and columns, in one embodiment.

FIG. 6 illustrates a process flow the accounting service can execute to implement a new product setup.

FIG. 7 illustrates elements of the process of FIG. 3 that can be programmed to process and use templates and hooks as defined herein.

DETAILED DESCRIPTION

Figure 1A:
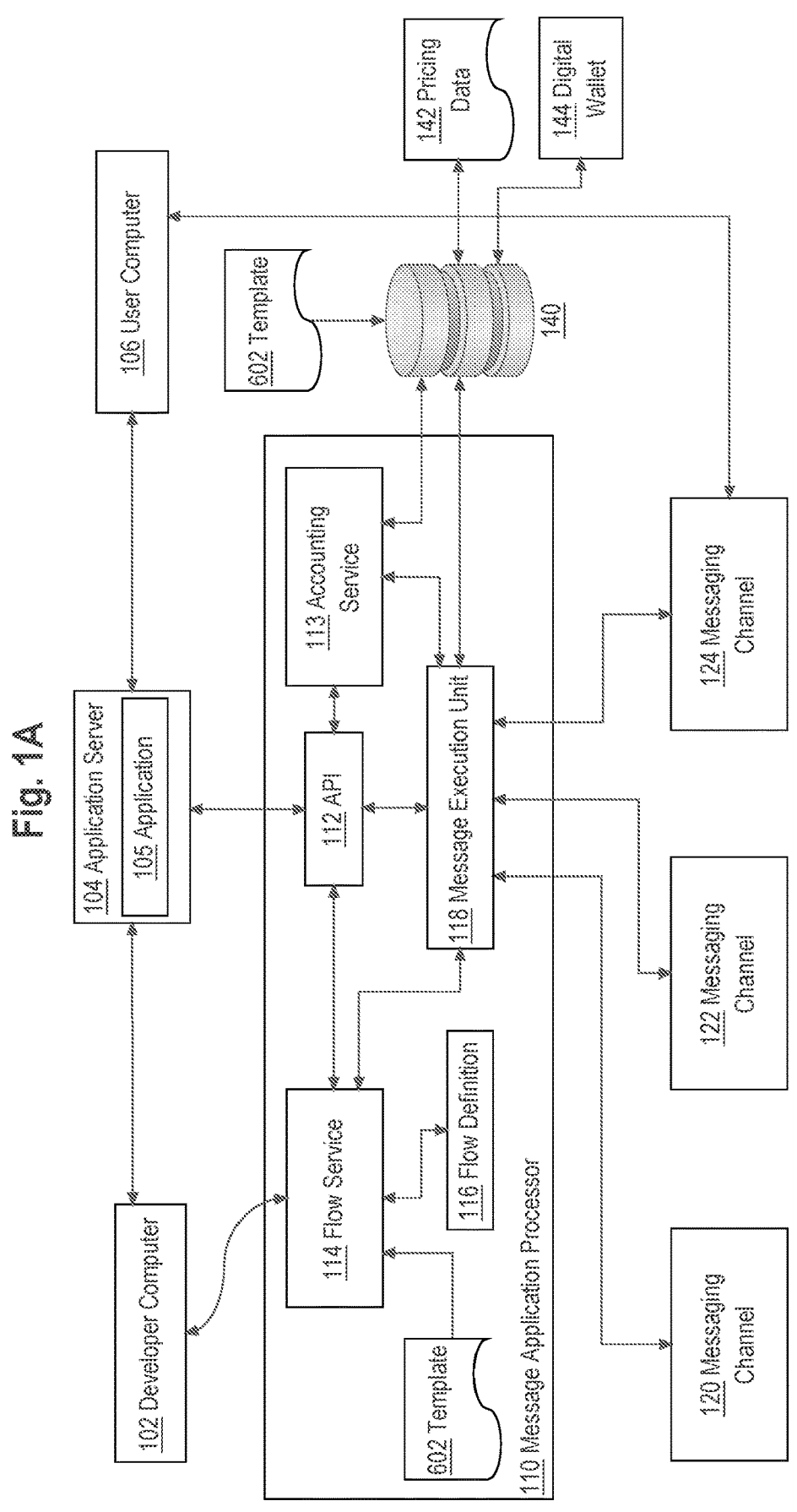
FIG. 1A illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:

1. General Overview
2. Structural & Functional Overview
3. Implementation Example—Programmatic Definition and Message-Speed Evaluation of Pricing Terms Using Application Programming Interface (API)
4. Implementation Example—Hardware Overview

1. General Overview

A distributed computer system implements a large-scale message processing system that can initiate, request sending, and monitor the transmission of messages using any of a plurality of different communication channels that are independent of the system. Different users, entities, or enterprises, including those having a customer relationship with an owner or operator of the message processing system, operate independent applications that can call the message processing system to request the system to originate or publish messages on any one or more of the channels. The messaging system defines different products, and product pricing, using digitally stored data structures in a high-speed database. As an enterprise requests the system to dispatch messages, the system automatically determines, at wire speed or message speed and thus typically in times ranging from a few milliseconds to 250 ms, which data structures, attributes, and values apply to the enterprise and the message and writes a pricing record to a database for future use in invoicing or charging.

In one embodiment, the disclosure defines methods, programmatic functions, and means of calling the functions and methods, typically using an application programming interface (API), that provides using digital structures:

1. The ability to define messaging products and group them into product families.
2. The ability to create price definitions or "pricings" for products, including pricings that can be effective on a future date or activated later so that an effective date of a pricing is considered at the time of a lookup, and pricings that are versioned and cannot be changed once active.
3. The ability to create different pricing depending on a combination or context of a product.
4. The ability to provide special pricing to major customers, create custom product bundles, and create custom pricings that are attached to products in the bundle.
5. The ability to determine the price of a product and its units subject to a fee or charge based on one or more of: organization identifier or orgId, product context, product (for example, SMS); a bundle identifier; an effective date; a tier value representing a magnitude or volume of usage, alone or in conjunction with metering; currency; product dimensions, such as the destination for an SMS message or the combination of source and destination for voice data.
6. Reporting capabilities, such as the ability to see reports on product usage in the context of other products and independently.

For purposes of illustrating a clear example, certain sections of this disclosure use terminology and describe processes that are specific to SMS messaging. However, other embodiments may implement voice calling, voice messaging, email transfer, and messaging using applications, apps, or platforms other than SMS, through similar calls, objects, formats, processes, and operations. In various embodiments, the disclosure encompasses the subject matter of the following numbered clauses:

1. A computer-implemented method, comprising: using a message application processor, programmatically receiving a first request to determine a fee associated with sending a digital electronic message using any one of a plurality of different communication channels, the request comprising at least a product identifier and an organization identifier; in response to the request, the message application processor executing: extracting the product identifier and the organization identifier from the message; based on the organization identifier, retrieving from digital data storage one or more configuration values that are associated with an organization corresponding to the organization identifier; the message application processor obtaining a time value corresponding to a then-current time; the message application processor querying the digital data storage, based on the product identifier and the time value, an applicable pricing for the message and corresponding to the product identifier and the time value; the message application processor causing digitally creating and storing a fee charge record based on the applicable pricing.

2. The method of clause 1, further comprising the message application processor signaling a charging service to create and store a fee charge event based on the applicable pricing.
3. The method of clause 1, further comprising: the message application processor retrieving, based on the product identifier, one or more of first data specifying a bundle that is associated with the organization identifier and the product identifier and second data specifying a product context that is associated with the product identifier; the message application processor updating a price applicable to the message based upon one or more of the first data and the second data.
4. The method of clause 1, further comprising: a database being communicatively coupled to the message application processor; the product identifier being one of a plurality of different product identifiers each corresponding to a different electronic digital messaging product of a product family, each of the different product identifiers being associated with at least one pricing, each pricing being associated with one or more dimensions; the database being configured according to a relational table schema that includes tables specifying each of the plurality of different product identifiers, the product family, the pricing, and the one or more dimensions.
5. The method of clause 1, further comprising the message application processor executing all of the steps of clause 1 in real-time for the message and each other message among thousands to millions of messages per second.
6. The method of clause 1, further comprising the message application processor executing all of the steps of clause 1 within 5 ms to 250 ms for the message, and processing from thousands to millions of other electronic messages per second using the steps of clause 1 within 5 ms to 250 ms for each of the other electronic messages.
7. The method of clause 1, the plurality of different communication channels comprising two or more of SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER.
8. The method of clause 1, further comprising: a database being communicatively coupled to the message application processor; the plurality of different communication channels comprising two or more of SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER; the product identifier being one of a plurality of different product identifiers each corresponding to a different electronic digital messaging product of a product family, each different electronic digital messaging product corresponding to a service of sending a messaging using a particular one of the plurality of different communication channels, each of the different product identifiers being associated with at least one pricing, each pricing being associated with one or more dimensions; the database being configured according to a relational table schema that includes tables specifying each of the plurality of different product identifiers, the product family, the pricing, and the one or more dimensions.
9. The method of clause 8, each of the one or more dimensions being associated in the database with a different destination of the message, the method further comprising the message application processor updating the price applicable to the message based upon applying a first discount value that is associated in the database with a first dimension among the one or more dimensions, the first discount being different than a second discount value that is specified in a second dimension among the one or more dimensions.

10. The method of clause 1, further comprising: each pricing being associated in the database with a different effective date; the message application processor receiving, in response to the querying the digital data storage, based on the product identifier and the time value, a result set of two or more applicable pricings for the message and corresponding to the product identifier; the message application processor filtering the result set based on the time value to remove one or more pricings that are associated with an effective date that is greater than the time value.

11. The method of clause 10, the database having a pricing table that is configured to store append-only records of the pricings.

12. The method of clause 4, the database having a pricing table that stores the pricings and is configured to store append-only records of the pricings, each of the pricings in the pricing table being associated with a version value, each of the pricings in the pricing table being immutable.

13. The method of clause 4, further comprising: storing, in the database, a first product context that associates the product identifier with a second product; storing, in the database, a second product context, that associates the product identifier with a third product; the message application processor retrieving, based on the product identifier, data specifying the first product context; the message application processor updating a price applicable to the message based upon applying a first discount value that is specified in first product context, the first discount being different than a second discount value that is specified in the second product context.

14. The method of clause 3, further comprising the message application processor updating a price applicable to the message by applying a first discount value that is specified in the bundle, the first discount value being different than a second discount value that is specified in a second bundle that is associated with the same product identifier and with a different organization identifier.

2. Structural & Functional Overview

2.1 Message Application Processor and Environment

FIG. 1A illustrates a distributed computer system showing the context of use and principal functional elements with which one embodiment could be implemented. In an embodiment, a computer system of FIG. 1A comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1A illustrates only one of many possible arrangements of components configured to execute the programming described herein. Other arrangements may include fewer or different components, and the division of work between the components may vary depending on the arrangement.

FIG. 1A, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1A, a developer computer 102 is communicatively coupled, directly or indirectly via one or more networks or network links, to an application server 104, which is also coupled to a message application processor 110 and to the user computer 106. The message application processor 110 is coupled to a plurality of different messaging channels 120, 122, and 124. Lines and arrows joining the developer computer 102, application server 104, message application processor 110, user computer 106, and messaging channels 120, 122, 124 broadly represent any combination of one or more local area networks, wide area networks, campus networks, or internetworks, using any of terrestrial or satellite links and/or wired or wireless network links.

Generally, in this arrangement, developer computer 102 is associated with a developer, owner, or operator of an interactive, online computer program application 105 that application server 104 executes. The developer computer 102 provides programming, configuration, testing, and maintenance concerning one or more applications 105 that execute at application server 104. User computer 106 interacts with the application server 104 to obtain a substantive service, such as a merchant service, online shopping service, financial service, entertainment or game service, educational service, or any other substantive application. Application server 104 can implement or host an HTTP server to facilitate delivering dynamic HTML applications to clients such as user computer 106 and to accomplish parameterized HTTP GET and POST calls to the message application processor 110. Application server 104 can implement an SMS handler for inbound (received) SMS messages using the POST HTTP method. Message application processor 110 originates messages to the user computer 106 via messaging channels 120, 122, 124, on behalf of the application server 104 and its applications 105.

Figure 5:
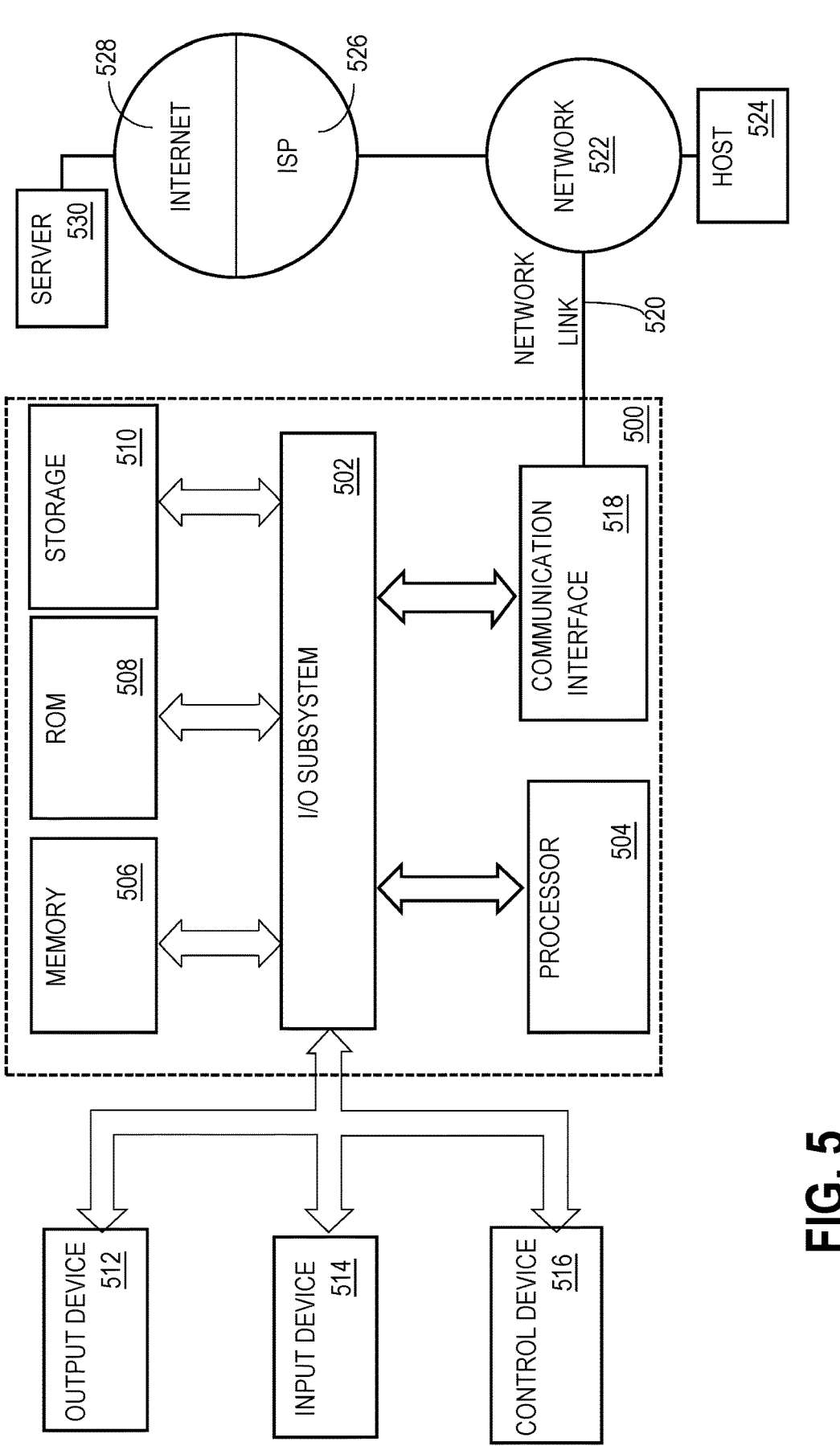
FIG. 5 illustrates a computer system with which one embodiment could be implemented.

Each of the developer computer 102 and user computer 106 can have the structure shown for a general-purpose computer in FIG. 5 and can be any of a laptop computer, desktop computer, workstation, or mobile computing device, in various embodiments. Application server 104 and/or message application processor 110 can be implemented using one or more server computers, processor clusters, and/or virtual computing instances in any of an enterprise data room, private data center, or public data center such as a cloud computing facility. Typically, the application server 104 and message application processor 110 are implemented using flexible cloud computing services with which processors, memory, and storage with different numbers, sizes, or capacities can be instantiated based on processing demand or number of clients. A commercial embodiment of message application processor 110 is the MESSAGEBIRD message processing system of MessageBird., Amsterdam, Netherlands.

The messaging channels 120, 122, 124 represent message networks, applications, or services and typically are independent of the message application processor 110. "Channel," in this context, refers broadly to a message service provider, all its independent infrastructure, and its software applications, application programming interfaces, and related services. Examples of channels include, as of this writing: SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER. The messaging channels 120, 122, 124 also can represent a mail transfer agent (MTA) integrated into the message application processor 110 or external to it for sending electronic mail (email). The messaging channels 120, 122, 124 also can include any message service, system, software, application, or app that is functionally equivalent to one or more of the foregoing and developed after the time of this writing.

In one embodiment, message application processor 110 comprises an application programming interface (API) 112, flow service 114, and message execution unit 118. Each of the API 112, flow service 114, and message execution unit 118 can be implemented using one or more sequences of computer program instructions, methods, functions, objects, or other units of program instructions. API 112 can be implemented as a Representational State Transfer (REST) API having a set of function calls that can be invoked programmatically from an application executing at application server 104. For example, application 105 can format and transmit an HTTP GET or POST request specifying the API 112 as an endpoint and having a parameterized payload that identifies a particular API call and values for use in processing the call. When creating a message is requested, the API automatically assigns a unique random identifier value so that applications can always check the status of the message using the API and the ID. API 112 can be integrated with an HTTP server and can be programmed to return an HTTP response to each API call that includes a payload with responsive values. API 112 can implement security controls based on access keys for authorization; for example, an owner or operator of the message application processor 110 securely generates an API key for the particular application 105 of the owner or operator of the application server and/or developer computer 102 and provides the API key to the developer computer. The application 105 is programmed to present the API key to the API 112 with each API call to authenticate the call and, as described in other sections, to enable associating flow definitions 116 with message state transitions for messages that are associated with the application. Requests and response payloads can be formatted as JSON using UTF-8 encoding and URL-encoded values.

Flow service 114 can be programmed to implement flow definition or authoring functions, and flow evaluation functions. In an embodiment, developer computer 102 can establish a connection to the flow service 114 for the purpose of authoring or defining a flow definition 116 (also termed a "flow") that defines one or more message states or state transitions and one or more instructions, calls, or other logic to be executed for messages having a particular state or state transition. In an embodiment, flow service 114 implements a visual, graphical user interface by which flows can be defined visually using a pointing device of the developer computer 102 to move or place graphical objects representing states, transitions, calls, or services.

Message execution unit 118 represents instructions that implement core message processing functions of the message application processor 110, such as message publishing services, interfaces to messaging channels 120, 122, 124, exception handling, and analytical reports. Message execution unit 118 can be programmed to create, read, update, or delete messages, message metadata, and control metadata in a database 140, which can be implemented using any of relational databases, no-SQL databases, object stores, or other data repositories. The programming and operation of message execution unit 118 are described further in other sections herein.

Furthermore, database 140 can be programmed or configured to digitally store pricing data 142 and a plurality of digital wallets 144 to support the execution of sequences of stored program instructions organized as an accounting service 113, which is more fully described in section 3. The pricing data 142 can conform to the table schema of FIG. 1C, as further described. Each digital wallet 144 can comprise a secure repository of digital data representing a value in a specified currency for a specified organization and can act as a deposit account against which the accounting service 113 charges fees or costs of message transmission, as further described. Thus, a developer computer 102 that is associated with an organization or enterprise can use banking networks to pre-load a digital wallet 144 of the organization with value to support requests to dispatch messages or conduct other message processing.

FIG. 1B illustrates a process of creating a flow definition. In one embodiment, at step 150, an authenticated login occurs to a developer account that is associated with a particular application operator that has been issued an API key for a particular application. For example, developer computer 102 completes an authenticated login to the flow service 114, using developer credentials that have been previously associated, in database 140 or another credentials store, with the owner or operator of the application server 104 and/or the API key previously issued for the application 105. The particular mechanics of credential creation, issuance, and storage are not critical, provided that the message application processor 110 can associate each flow definition 116 that the developer computer 102, or a developer account, creates with the particular application 105 and its API key.

At block 152, a flow definition is created having a unique flow identifier, a plurality of steps, and at least one transformation. In some embodiment, creating a flow definition comprises the developer computer 102 providing input to a visual flow design application of the flow service 114 and selecting a flow creation function. In response, the flow service 114 automatically creates a flow definition 116 in the database 140 and assigns a unique flow identifier to the flow definition, which is stored in the database record. In some embodiments, the flow identifier can be algorithmically or cryptographically based upon the API key of the application 105, or the record of the flow definition 116 in the database 140 can include a reference to the application 105 or credentials that can be used to generate or validate the API key of the application 105. The specific mechanism and data values stored in this process are not critical, provided that the flow service 114 can establish a binding of the flow definition 116 to the particular application 105, so that the flow definition can be invoked only at specified state transitions of messages that the particular application originated or manages. The steps and transformation of the flow definition 116 can be created and specified as further described in other sections for FIG. 4.

At block 154, the flow definition is hooked to a specified pair of message states, based on the flow identifier, for messages of the particular application. In an embodiment, block 154 involves the developer computer 102 providing input to identify the particular application 105 and to select a particular pair of message states from among the available message state values. Examples of message state values are described in the next section for FIG. 2. The flow service 114 can implement a graphical user interface with widgets by which the developer computer can select pairs of available or defined message states. In response to a SAVE selection, or similar function, the flow service 114 can be programmed to persistently store a flow hook with identifiers of the specified pair of message states and a reference to the database record for the flow definition 116. In some embodiments, a fast, in-memory hook lookup table is maintained in main memory of message application processor 110 that maps pairs of available message state values or transitions to flow identifiers. Flow definitions 116 can be indexed by flow identifiers and stored in a fast-access database. Collectively, the hook lookup table and flow definition storage should support wire-speed lookup, retrieval, and evaluation of flow definitions as high-speed messages are managed by the message application processor 110 at a large scale.

Figure 2:
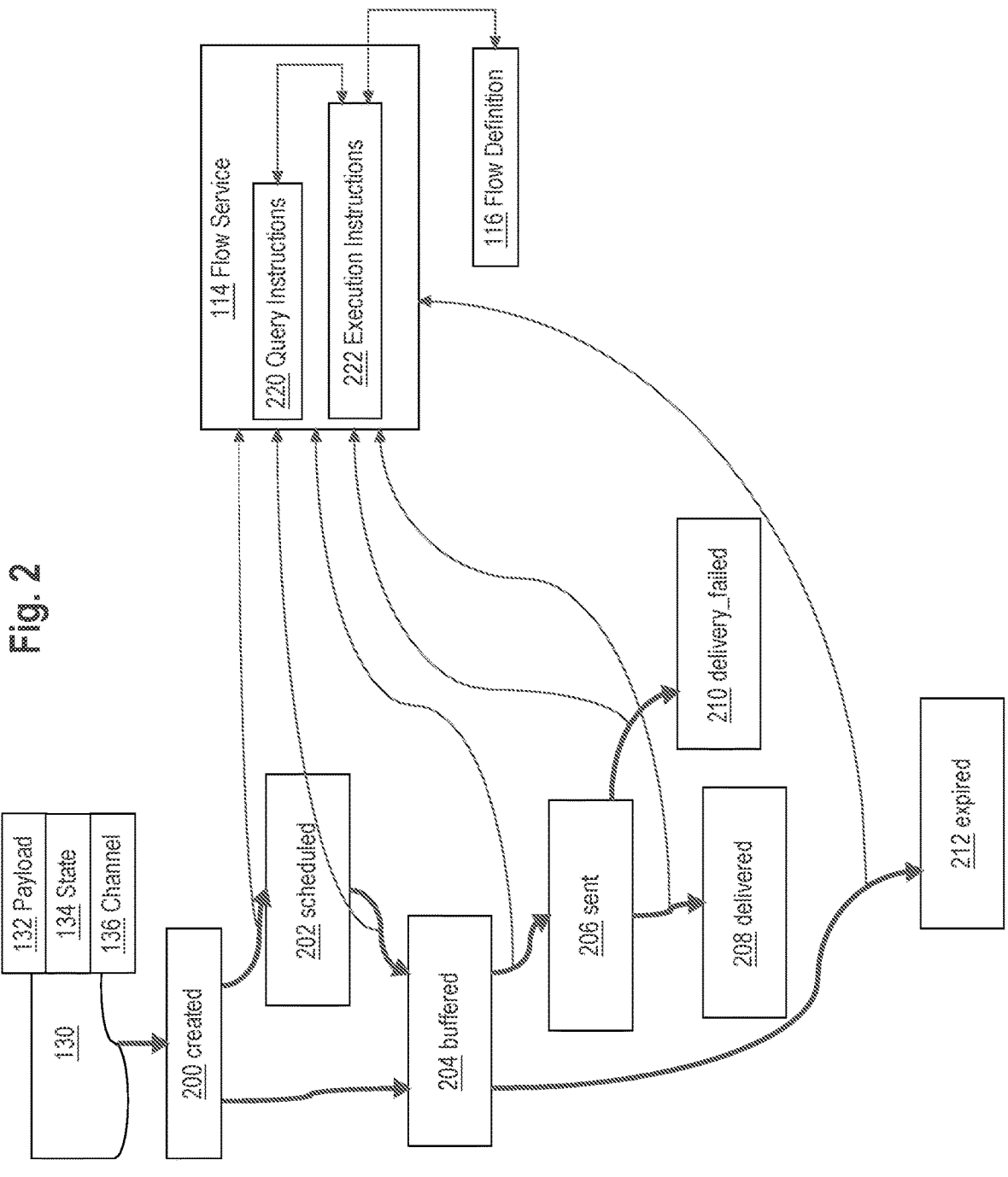
FIG. 2 illustrates data flow relationships between a plurality of different message states and a flow service that evaluates a flow definition.
Figure 3:
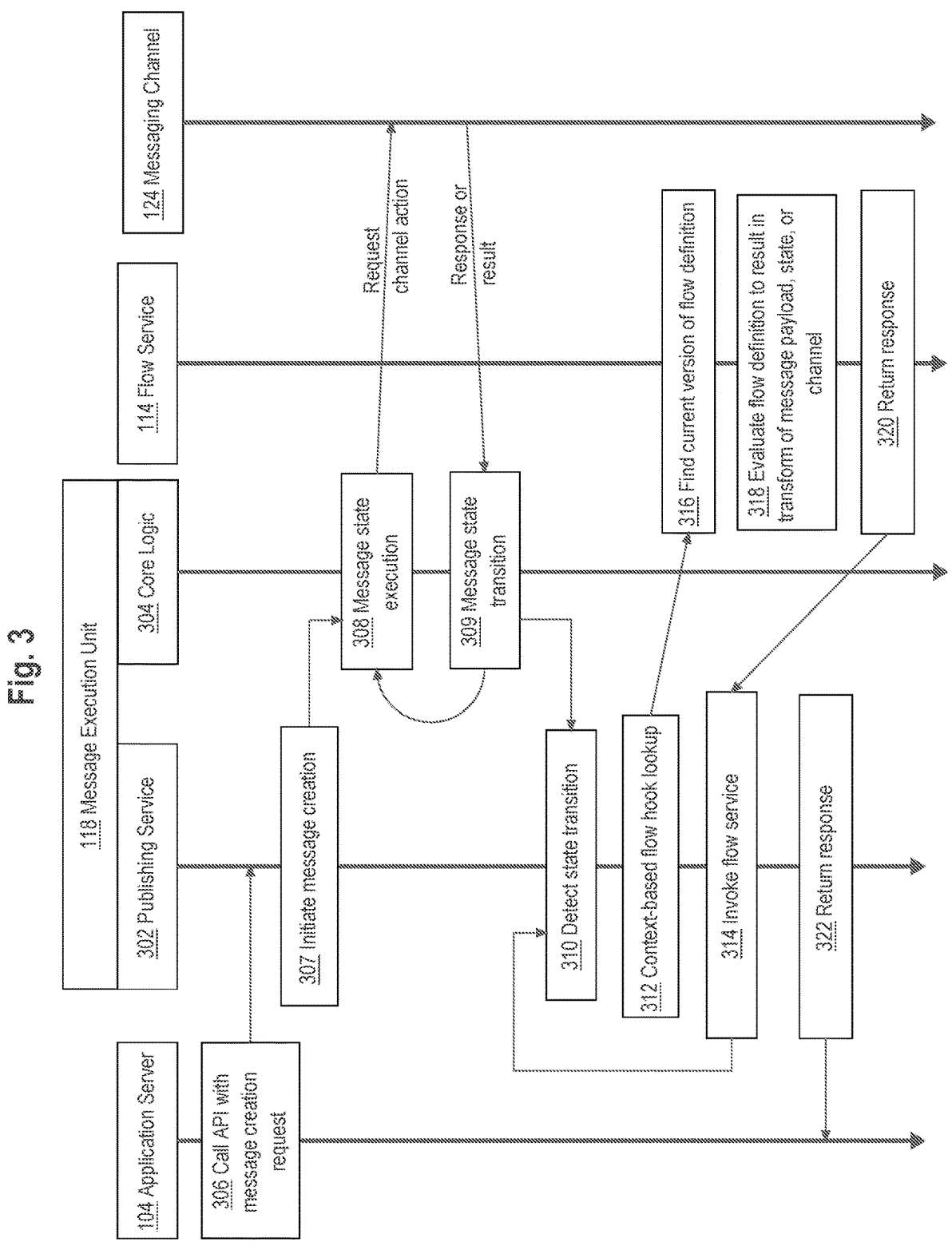
FIG. 3 illustrates an example process flow that can be programmed to implement injection of code logic into message state transitions in a message processing system.

FIG. 1B represents a preparatory state for creating flow definitions 116, storing records, and joining flow definitions to message transitions for access and invocation later. FIG. 2, FIG. 3 will focus on runtime aspects of processing flow definitions 116.

2.2 Message States and Flow Processing

FIG. 2 illustrates data flow relationships between a plurality of different message states and a flow service that evaluates a flow definition. FIG. 2 and each other flow diagram herein are intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, as detailed in other sections, the operation of the message execution unit 118 in response to calls from application server 114 results in creating one or more messages 130. Each message 130 comprises a digital object or data structure that is digitally stored in the main memory of the message application processor 110 and can be transiently stored in database 140. Each message 130 comprises a plurality of digitally stored attribute values including but not limited to a payload 132, state 134, and channel 136; the payload may be termed a body and can comprise a plurality of other values, the state may be termed a status value, and the channel may be an identifier of one of the channels 120, 122, 124. A message object, in one embodiment, can comprise a message object identifier; a reference such as a URL of the object; a direction value specifying sent or received; a type value specifying SMS, binary, flash, etc.; an originator identifier; reference value; a reporting URL for status reporting; a validity value specifying a period of message validity; a gateway route identifier; a string payload; a message class value; a scheduled date/time value; a created date/time value; a hashmap of recipient information. In an embodiment, the recipient information can comprise an array specifying a count, status values, and items for each of a plurality of recipients.

Status values can correspond to state values. In an embodiment, the message 130 progresses through two or more states, as shown in FIG. 2, and states can include but are not limited to a created state 200, scheduled state 202, buffered state 204, sent state 206, delivered state 208, delivery failed state 210, and expired state 212. Other embodiments can define more or fewer states.

In some embodiments, each of the states of FIG. 2 also is associated, in message 130, with a status reason value or code that can specify details about the message status. In one embodiment, values of the status reason or code can include: successfully delivered, pending delivery report or receipt (DLR), DLR not received, unknown subscriber, unavailable subscriber, expired, opted out, received network error, insufficient balance, carrier rejected, capacity limit reached and generic delivery failure.

In an embodiment, at any of the created state 200, scheduled state 202, buffered state 204, sent state 206, delivered state 208, delivery failed state 210, and expired state 212, or at a state transition, the flow service 114 can be invoked under control of the message originator. In some embodiments, the flow service 114 implements a hook management API, which the developer computer 102 can use to create a hook between two states and to reference a particular flow definition 116 to run based on its flow identifier. In FIG. 2, arrows that link one state to another state represent state transitions, and arrows linking the flow service 114 to other arrows represent hooks to state transitions.

In an embodiment, flow service 114 is programmed with query instructions 220 and execution instructions 222. The query instructions 220 are programmed to determine whether a flow definition 116 is stored in the database 140 or in memory or otherwise available based upon a then-current context of message 130 and the particular state or transition that occurred. If a flow definition 116 exists that matches the current context, then the flow definition is accessed or retrieved and evaluated using execution instructions 222, based on message 130, payload 132, state 134, channel 136, and other attributes of the message. Thus, in an embodiment, each of the states 200 to 212, inclusive, is capable of triggering an invocation of the flow service 114 and evaluation of a flow definition 116 to execute or use rules or programmed logic of the flow definition to act on the message 130 or to call an external service.

FIG. 3 illustrates an example process flow that can be programmed to implement injection of code logic into message state transitions in a message processing system. FIG. 3 shows a progression of operations that advance in time from top to bottom of FIG. 3, showing actions taken respectively by application server 104, message execution unit 118 of message application processor 110, and messaging channel 124.

In some embodiments, the functional execution of message execution unit 118 can be divided among a publishing service 302 and core logic 304, which can represent functionally independent sets of instructions within the message application processor 110. In this example, the publishing service 302 is responsible for initiating message creation, initiating flow hook lookups, and other interfacing between the application server 104, the core logic 304, and the flow service 114. However, in other embodiments, any service of the message application processor 110 can act in the same manner as the publishing service 302, such as a conversations service, voice call service, or voice messaging service. Each service can execute an independent evaluation of the hook lookup and evaluation functions.

FIG. 3 shows a process flow that initiates by using a message application processor for receiving a first request from a separate application server computer executing a particular computer program application to create and cause sending a digital electronic message. In an embodiment, as shown at operation 306, application server 104 executes a host application which, in the ordinary course of execution, calls the API 112 of message application processor 110 and provides a message creation request. The call of operation 306 could occur at any step in the execution of the host application at which a message processing function is required or useful. The particular position of the call in a logical flow of the application will vary based upon the particular application that the application server 104 hosts or runs. In some embodiments, the request comprises a template version identifier, the template version identifier being associated in a database with a previously defined template that associates a locale value and a platform value, and the request specifies a location value corresponding to a geographic location of a recipient of the message.

In response to the call of operation 306, API 112 can be programmed to signal message execution unit 118 that a call has been received specifying creating a message. In further response, the message execution unit 118 can programmatically call the publishing service 302 to process the request. FIG. 3 can continue with, in response to the request, the message application processor creating the message and assigning a status value to the message, the status value being associated with a first state of the message. The publishing service 302 then initiates creating a message at operation 307. The publishing service 302 can represent or include an originator process or agent, or thread that the publishing service instantiates or creates for each application server 104, application, or user session.

Assume that a message object like message 130 (FIG. 2) is created in memory, and the status value of the message object is set to the created state 200 and then the buffered state 204. At operation 308, the core logic 304 executes instructions associated with the buffered state 204 and requests the messaging channel 124 to dispatch the message. Depending on the configuration and operation of the messaging channel 124, at some later time, a response or result is transmitted back to the core logic 304, resulting in a message state transition at block 309. Thus, FIG. 3 comprises the message application processor causing the message to transition to a second state. In some embodiments, message application processor 110 implements a distributed state machine in which multiple different back-end services are programmed to assign states to a message depending on the then-current logical position of the message in a message flow or lifecycle, and therefore FIG. 3 represents a simplified view of state assignment. Importantly, the message application processor 110 implements the state machine rather than the application server 104 or an application it hosts.

At operation 310, the publishing service 302 detects the message state transition at block 309. In one embodiment, to detect message state transitions, the publishing service 302 subscribes to an event bus on which the core logic 304 publishes all message state transitions. This approach places the processing burden of handling a large number of messages and message state transitions on the message originator, such as publishing service 302 or its threads or agents, rather than on the core logic 304, thereby enabling the message originator to use context data to determine what action to take when a particular state transition occurs.

FIG. 3 can continue with the message application processor performing a flow hook lookup to determine whether a flow definition is associated with the transition from the first state to the second state and with the particular computer program application, and in response thereto, evaluating the flow definition based on the message to result in executing an operation specified in the flow definition using one or more of a payload of the message, the status value, or a channel identifier of the message. In an embodiment, at operation 312, the publishing service 302 conducts a context-based flow hook lookup. Operation 312 is programmed for the publishing service 302 to determine, from main memory or persistent storage such as database 140, whether a flow definition 116 exists given the then-current context of the message. Context data such as message state, status reason, and any other attribute of the message 130 or message object can be used to determine whether to look up a flow hook. Or, the application server 104 can specify context data in the call of operation 306, and that context data can be used to determine whether a flow hook lookup should occur.

If the context data results in a programmatic decision to conduct a flow hook lookup, operation 312 invokes flow service 114 with a request to find a current version of a flow definition 116. The operation 316 inspects memory or persistent storage for a hook, link, reference, or pointer to a current version of a flow definition 116, and if found, the flow definition is loaded.

At operation 318, flow service 114 evaluates the flow definition based on message 130 and all attribute values of the message or message object. As a result, the flow definition can cause one or more transformations of the message payload, message state, or message channel. Specific kinds of transformations and operations are described herein in other sections. In various embodiments, an operation in the flow definition can be programmed for specifying a transformation of the message from a first payload value to a second payload value, specifying a transformation of the status value to a third state, specifying a transformation of the channel identifier to specify a different particular communication channel among the plurality of different communication channels, specifying a fetch of a plurality of data values from a specified network location, with FIG. 3 further comprising, in response to executing the fetch, storing the plurality of data values in a corresponding plurality of program variables in the main memory of the message application processor, or specifying an HTTP request to a specified network location. Or, the operation in the flow definition can specify a plurality of machine-executable instructions in a programming language capable of interpretation or in script code. Examples include PYTHON, LUA, RUBY, JAVASCRIPT, PHP.

In some embodiments, flow service 114 can implement logging to track all message transformations, and operation 318 can be programmed to write a record to a log file specifying what transformations occurred at the operation. The flow service 114 can implement a log file query operation that the developer computer 102 can access to view the contents of message flow logs. Therefore, the developer computer 102 can see the transition of a message over time for analytical purposes, including message campaign analysis, what conditions triggered which changes in state and in what amount, and so forth.

At operation 320, flow service 114 returns a response. In some embodiments, operation 320 comprises returning a message object if the evaluation of the flow definition was successful and an error object if the evaluation failed. Or, a response indicates success, failure, or a new payload, with a reference to the previous payload. Control then transfers back to operation 314, at which the response is received, and the publishing service 302 can return a commensurate response at operation 322 specifying whether the call of operation 306 succeeded or failed. Each response can include response codes or payloads with detailed explanations of the success or failure.

Core logic 304 can be viewed as executing asynchronously with respect to publishing service 302, flow service 114, and application server 104. Therefore, message state execution at operation 308 and message state transition at block 309 can occur in a separate thread independent of the execution of the other blocks and process flows shown in FIG. 3. In this manner, messages can transition between the first state and the second state as two states among a plurality of different possible states of a state machine that the message application processor implements to process the message. In some embodiments, the different possible states of a message are: created, scheduled, buffered, sent, delivered, delivery failure, and expired.

In some cases, message state execution at operation 308 comprises the message application processor selecting, based on the channel identifier, a particular communication channel among a plurality of different communication channels and transmitting a request to the particular communication channel to transmit the message using the particular communication channel. Such a request can occur in the first iteration of FIG. 3 or in subsequent iterations of operations 308, 309, 310, 312, and so forth. Or, in an embodiment, message state execution at operation 308 comprises the message application processor selecting, based on the platform value and locale value of the template corresponding to the template version identifier, and the location value of the recipient, a particular communication channel among a plurality of different communication channels, and transmitting a request to the particular communication channel to transmit the message using the particular communication channel.

With the foregoing process, the developer computer 102, application server 104, and/or an enterprise or customer with which they are associated can access programmatic means to hook into and manipulate the states of a message during processing by the message application processor 110, including causing the execution of any desired logic between the states, and to change the states. Further, a channel can be selected based on the geographic location of a recipient so that different communication channels are invoked, called, or used for recipients in different geographies around the globe, within a continent, or within a region or unit of a continent.

2.3 Flow Example

Figure 4:
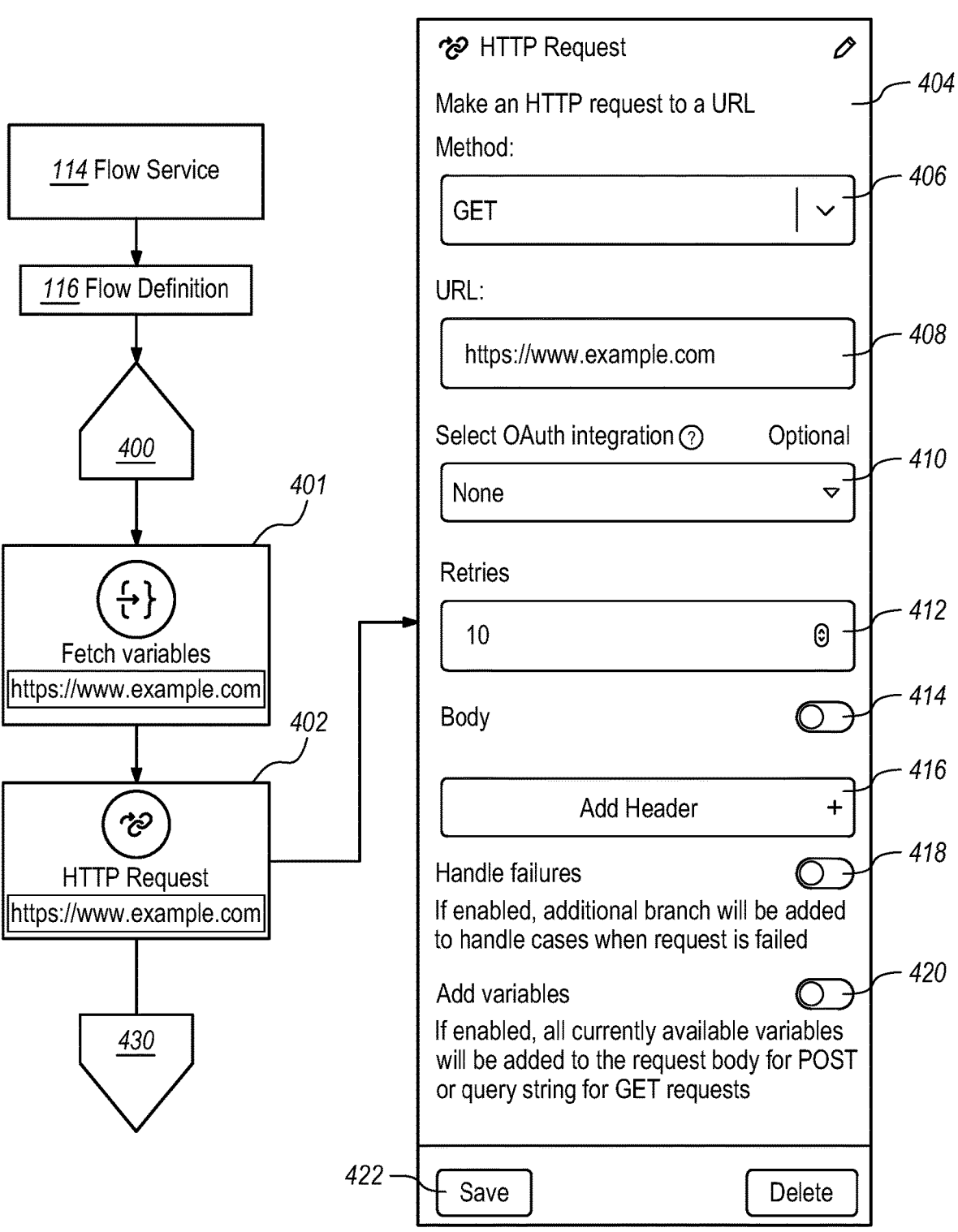
FIG. 4 illustrates an example visual flow definition process in one embodiment.

In some embodiments, flow service 114 is programmed to implement a visual, graphical design application by which each flow definition 116 can be visually defined. FIG. 4 illustrates an example visual flow definition process in one embodiment. The flow service 114 is used to create a flow definition using a plurality of steps 400, 401, 402, 430, each of which can be represented using a graphical icon in a visual workspace of a graphical user interface of a computer display device. Steps 400, 430 represent initiation and termination steps, respectively; step 401 is programmed to fetch one or more values from external APIs and to store the values in programmatic variables for use in the remainder of the flow; step 402 is programmed to generate an HTTP request to an external service, optionally using one or more of the values of the programmatic variables.

In one embodiment, step 401 is programmed to transmit network requests to a specified server or endpoint and to assign the response to variables within a memory domain of the flow service 114 for local use in processing other flow steps. The endpoint is expected to be associated with a networked server that responds to the request with a digital object that contains string values. Step 401 can be defined by visually specifying a network address of the target server, a method of access, and one or more variable names that match the keys of the JSON object of the response.

In one embodiment, the URL is an address of a website associated with the developer computer 102, application server 104, or an external HTTP endpoint. The URL is specified using either a hardcoded URL value starting with http:// or https:// or a variable. The method of access can be specified as GET, POST, PUT, DELETE, PATCH, HEAD. In some embodiments, a request body can be specified, to be used with the "Set Content-Type header" field so that the receiver of the request can decode it correctly. In an embodiment, a headers value specifies a dictionary of key-value pairs; the key is a header name, and the value is the header value used for sending HTTP requests. In an embodiment, a variable name is specified for use in later steps. Each variable name must match the keys of a digital object in response. For example, a JSON response from the server might contain the following:

```
{
    "name": "Example user",
    "zip_codes": ["31123", "31125"],
    "billing": {"bank": "ABN AMRO"}
}
```

A flow definition that is compatible with such a response could define local variables to be maintained in memory by the flow service 114 as name, zip_codes[0], zip_codes[1] and billing.bank. After executing the fetch variables step, the variables would have the values "Example user," 31123, 31125, ABN AMRO, respectively.

Step 402 is programmed as an HTTP request step to make an HTTP request from the flow service 114 to a URL, for example, to send data without using any response in the flow. In an embodiment, step 402 can be added to the flow definition 116 by dragging an icon representing the step from a visual palette into a workspace and moving the icon near step 401, at which point an attachment arrow is added automatically. The flow service 114 can be programmed, in response to input from the developer computer 102 to select step 402, to generate and cause displaying a dialog box 404 that is programmed with GUI widgets to receive specified data values in specified formats, the data values collectively defining the step. In one embodiment, dialog box 404 comprises a Method widget 406 that is programmed as a pull-down menu and can specify an HTTP request method used for the request; selecting the pull-down menu enables the developer computer 102 to specify one of GET, POST, PUT, DELETE, PATCH, HEAD.

In one embodiment, dialog box 404 comprises a URL widget 408 that is programmed to accept typed text to specify a network address to a website or an external HTTP endpoint. The value can be a hardcoded URL starting with http:// or https:// or a variable. In one embodiment, dialog box 404 comprises an OAuth Integration widget 410 that is programmed as a drop-down menu to enter a specification of NULL or "None", or one of a plurality of OAuth2 authorization integrations to be used at the HTTP Request step.

In one embodiment, dialog box 404 comprises a Retries widget 412 that is programmed as a numeric widget constrained to the values "0" to "10" to specify the number of retries in case the HTTP request fails. In one embodiment, dialog box 404 comprises a Body widget 414 that is programmed as a toggle switch which, when selected to ON, enables defining the body of requests. The value of the Body option is used with the "Set Content-Type header" field to enable the receiver of the request to decode it correctly. In one embodiment, dialog box 404 comprises an Add Header widget 416, which, when selected, enables the developer computer 102 to specify a dictionary of key-value pairs. The key is the header name, and the value is the header value used for sending HTTP requests.

In one embodiment, dialog box 404 comprises a Handle Failures widget 418 that is programmed as a toggle switch which, when selected to ON, causes adding a branch to the flow definition 116 to specify further processing to execute if a request fails. In one embodiment, dialog box 404 comprises an Add Variables widget 420 that is programmed as a toggle switch which, when selected to ON, causes adding all currently available variables to the request body for POST or query strings for GET requests. A SAVE widget 422 can be programmed to receive input to cause saving the data values of dialog box 404 in the database 140.

For purposes of illustrating a clear example, this section and FIG. 4 illustrate two kinds of steps for fetching variables and issuing HTTP requests. However, embodiments can implement many other kinds of steps, each of which can be selected and added to a flow definition in any desired sequence. For example, flows can impose execution limits and timeouts to force an advancement to the next state if specified flow logic takes too long.

2.4 Practical Applications

The embodiments of this disclosure can be applied to many practical situations of data processing, communications, or interoperation with other systems. A flow can specify forwarding an SMS message to an email, causing creating and sending an email when an application receives a new SMS message. A flow can specify creating voice-based menus for an interactive voice response system. Abandoned cart engagement can be achieved by sending text messages to customers who left items in an online shopping cart. Automated responses in customer support SMS workflows can be defined.

As another example, engaging user experiences based on data can be created. The developer computer 102 can specify a trigger condition, such as an incoming message or a new order on the application server 104. The developer computer 102 can add steps to conduct language detection, route messages, and make relevant API calls. Different programmatic interactions across communication channels can define a specific customer path or experience. The developer computer 102 can design logic to route data and update application server 104 to reflect the latest updates from customer communications. Other embodiments can create more meaningful customer interactions on the platforms that customers know and use; for example, a flow can define how to complete sign-up forms via WhatsApp, exchange rich media on Messenger, enable orders via SMS, or schedule appointments on WeChat.

In other embodiments, flows can build data pipelines. Flows can empower a contact center with information from a CRM system, build pipelines for marketing campaigns, or centralize context from support software. Flows can move data between third-party sources like Point of Sale Systems (POS), CRMs, fulfillment providers, order processing systems, and more. Flows can connect data cross-functionally by creating data pipelines across various sales, marketing, and support tools. Flows may be able to determine the preferred language and communication channel of customers for updating a customer profile.

It will be apparent that flow definitions 116 can specify many useful actions in response to specific message content, states, or state transitions. For example, a flow definition 116 can implement content moderation. The flow definition 116 can be programmed to determine that a message 130 (FIG. 2) contains profanity and, in response, to change the value of the state 134 from the created state 200 immediately to the delivery failed state 210 without transitioning to the scheduled state 202 or buffered state 204.

Or, after creating the message 130, the application server 104 may need to generate a unique code to be attached to the message, such as a two-factor authentication code. In one embodiment, application server 104 can call a Post Messages function of the API 112, provide a customer ID associated with developer computer 102 or the application server, and cause generating a 4-digit or 6-digit code; the flow definition 116 also could inject arbitrary content into the message 130 to explain the code. In another example, a flow definition 116 could implement A/B testing in which the application server 104 requests a particular message 130, but the flow definition specifies, after the created state 200, to transform the message payload using one of two alternatives.

A flow definition 116 also can be programmed to implement templating and localization. The application server 104 could be programmed to output content for a message 130 in English, but a flow definition 116 could specify, after the created state 200 or scheduled state 202, to trigger a transformation of the text to Dutch or another language; after the flow concludes, a transition to the buffered state 204 could occur, causing sending the message in Dutch.

In a further example, flow definition 116 is configured to cause the replaying of a message over another channel. For example, assume that the messaging channels 120, 122, 124 operate with servers, owners, or operators in different countries and impose different per-message rates based on location. The application server 104 could be programmed to use a first messaging channel 120 by default but, in response to detecting that the user computer 106 is located in a particular country, to switch to a different messaging channel 122 with a better cost structure. A particular example could be switching from SMS to WHATSAPP because WHATSAPP offers better delivery rates in some countries. In this case, the flow definition could specify sending messages over WHATSAPP and switching to SMS in response to the delivery failed state 210 or another state associated with determining that the customer does not have a WHATSAPP number.

In yet another example, flow definition 116 could specify using a push notification or web sockets notification. For example, if application server 104 implements a mobile application and the user computer 106 is a mobile computing device, flow definition 116 could specify concurrently creating a message and transmitting it over a web socket channel and calling back to the application server to request sending an in-app notification.

In all these examples, the disclosure provides the key benefit that the developer computer 102 and/or an owner or operator of the application server 104 does not need to implement their own messaging application, using SMS or any other channel. Instead, the message application processor 110 is programmed for interfacing and integrating with a plurality of different messaging channels, and the owner or operator merely needs to specify workflow operations across multiple channels using a flexible flow definition process. Without changing the application server 104 or applications that it hosts, the owner or operator can operate a service that can switch channels among SMS, WHATSAPP, or others to change application behavior via state injection in the messaging flow.

3. Implementation Example—Programmatic Definition and Message-Speed Evaluation of Pricing Terms Using Application Programming Interface (API)

3.1 Product Families, Products, Pricing, Pricing Dimensions

In an embodiment, the processes, functions, and programming defined in the following section are configured to create and store a plurality of column attributes, rows, and tables in the database 140 to represent the pricing data 142. FIG. 1C illustrates an example data schema that can be used to structure tables, table relationships, rows, and columns, in one embodiment. The accounting service 113 can be programmed to interoperate with tables, rows, and column attributes of data in database 140 that conform to FIG. 1C.

In an embodiment, a product family 160 is a collection of complementary products 162A, 162B that are marketed under the same brand name. Example names of product families include Channels—WhatsApp, Channels—SMS, Inbox. Each product 162A, 162B is a messaging-related item that the owner or operator of a messaging system offers for sale. The usage of a product depends on the product family in which it is defined. Example products include: Outbound SMS (product family=Channels—SMS), OTP messages (Channels—WA), Pro plan (Applications—Inbox). For purposes of illustrating a clear example, FIG. 1C shows product family 160 with two products 162A, 162B, but other embodiments and implementations may have any number of products limited only by the available data storage and processing resources.

In an embodiment, each of the products 162A, 162B is associated with a pricing like pricing 164 for product 162A. A pricing 164 is an immutable definition, digitally stored in one or more data structures or tables in database 140, that holds a collection of dimensions 166A, 166B, each of which may be used by a charging system. An example of a pricing 164 could be "Base pricing plan v1." For purposes of illustrating a clear example, FIG. 1C shows pricing 164 with two dimensions 166A, 166B, but other embodiments and implementations may have any number of dimensions limited only by the available data storage and processing resources. Each of the dimensions 166A, 166B is the most granular unit which defines the currency, unit price and tier, if a tier applies. Examples of dimensions could be SMS sent based on MCC+MNC for SMS, and call duration for a Voice call.

Two or more products 162A, 162B can be grouped or associated via a definition of a bundle 168. Typically, bundle 168 is a grouping or association of different products having one or more discounts that are defined based on combinations.

In an embodiment, database 140 is configured with pointers, table references, or other associations for the data elements of FIG. 1C that collectively associate column attributes of the data elements in a set of attributes 167 for each product. In one embodiment, attributes 167 can comprise organization identifier (orgID), productContext, product, bundleForCustomer, effectivePricingDate, tier, currency, and product_dimension; all or a subset may be relevant to resolving a particular pricing event for a particular message or call. The accounting service 113 can be programmed to obtain one or more values for attributes 167 in at least three distinct ways. First, the accounting service 113 can be programmed to directly extract one or more of attributes 167 from a particular API call and store them in memory. Second, the accounting service 113 can be programmed to derive one or more attributes 167 from values in a call; for example, after obtaining an identifier of a product 162A in an API call, the accounting service can query the database 140 to identify a bundle 168 that includes the product 162A. Third, accounting service 113 is programmed to maintain certain configuration values for a particular customer or Organization in other database tables not shown in FIG. 1C and retrieve the configuration values on demand and add them to attributes 167. For example, in response to receiving a call relating to pricing services that specify an organization identifier, the accounting service can be programmed to read an organization configuration table of database 140, retrieve configuration values for that organization, and associate the configuration values in memory with others to form attributes 167. Examples of configuration values can include tier, currency, and product context. The product context value can reflect the fact that the same organization is a known user of two or more products; one example product context is "Inbox+SMS," specifying that an organization uses MESSAGEBIRD INBOX and also SMS messaging. Other services and programs can modify the configuration values; for example, as overall message traffic increases, the message execution unit 118 can be programmed to update the tier value if a particular volume tier is exceeded. Specific sets of attributes 167 can be cached in memory to reduce database accesses and latency.

In one embodiment, the programmatic architectures defined herein implement immutability in product and pricing specifications. With immutability, while user input can specify pricing changes at any time, each change is digitally stored on an append-only basis. For example, once a pricing plan is active, updating dimensions is not possible unless user input specifies a new version of an existing pricing plan.

In one embodiment, product pricings are stored as a tree of products. Pricing is configured considering the last child product in the tree, as the parent nodes provide the context of product usage. In programmatic terms, effective dates are enforced by testing for an available pricing definition, whether the present time is after an effective time value, for example, 'nowo>=effectiveAt'. If new pricing is created, a default value of 'effectiveAt=now( )' is created and stored; however, user input can specify other values, such as 'effectiveAt=nowo+add(10 days)', to create pricings that are active in the future. Moreover, the input can specify special pricings for an organization by creating an offer or bundle with a product-pricing tree and a dimension that overrides those within the organization's scope. Values for such special pricings are inspected before the product pricing lookup.

Calls, data inputs, and data outputs can be specified in an application programming interface for defining product families for pricing in a large-scale messaging system. Calls to the API can occur at operation 306 (FIG. 3) to invoke and use a particular template to create a message. Thereafter, the message application processor 110 is programmed to automatically dispatch the message, as part of executing the flow of FIG. 3, on the channel specified in the template when other attributes of a message match the attributes of the template, such as locale.

In an embodiment, a "workspace" is a customer instance or user instance in which different messaging techniques can be defined and then used. Platforms provide messaging capabilities; examples of platforms are SMS; MMS; WHAT-SAPP; FACEBOOK MESSENGER; WEIXIN/WECHAT; QQ; TELEGRAM; SNAPCHAT; SLACK; SIGNAL; SKYPE; DISCORD; VIBER. Channels are the installation of a platform for a workspace; thus, for the corporation, enterprise, or organization named "ALPHA MOTOR COMPANY," the channelId "ALPHA TEXT 1" could refer to SMS as used by Alpha for customer communications. Messages are the data sent and received through channels. Hooks are programmatic constructs that detect and react to events in channels, and can embody user-created program code that executes in response to a particular event occurring in a channel. An example could be detecting a responsive message STOP from a customer on the SMS channel.

A programmatic call to a Product Family API can create new families that may or may not be visible through the API. In an embodiment, access controls or security controls can be implemented using the system services that are available in the infrastructure that supports the execution of the system. For example, when the computer system 100 is implemented using AMAZON AWS, MICROSOFT AZURE, or similar systems since product families are root-level constructs, only users that have specific policies attached to their user through Identity and Access Management (IAM) roles can use the PUT/POST APIs. In contrast, other users or programs can have open permission to programmatically retrieve and list the available public product families. In some embodiments, a Product Family can be defined as any of: 1. Channels—SMS; 2. Channels—WhatsApp; 3. Applications—Inbox; 4. Applications—Campaigns; 5. Flows; 6. Contacts; 7. Support. Embodiments can implement processing power and storage sufficient to support up to hundreds of product families at most.

In an embodiment, calls, data inputs, and data outputs can be specified in the same or a different API for defining products for pricing in a large-scale messaging system. In an embodiment, a Product Family is associated, by data definitions or programming, with one or more Products. Depending on the Product Family, the Product may differ across products. Examples of a Product include 1. For Channels—SMS: Outbound SMS, Inbound SMS; 2. For Channels—WhatsApp: Conversation-based, Promotional messages, OTP messages; 3. For Channels—Voice: Outbound calling, Inbound calling; 4. For Applications—Inbox: Basic, Pro; 5. For Flows—Invocations, Step transitions. In an embodiment, a Product is not specific to a customer of the messaging system; however, user input can specify product plans that could be associated with bundles for classes of customers. Examples of customer classes include small-to-medium businesses and individual software vendors. Implementations can have processing support to typically support tens to hundreds of products per product family.

The same or a different API can specify calls, data inputs, and data outputs for an implementation of an API for defining pricings in a large-scale messaging system. The same of a different API can specify calls, data inputs, and data outputs for an implementation of an API for defining pricing dimensions in a large-scale messaging system.

3.2 Processing Bundles and Offers

In an embodiment, a plurality of different application scenarios can interoperate with definitions of bundles and offers. For example, a pricing selection service can determine which unit price to use. Provided that a calling service can supply a product identifier, such as "SMS," the accounting service 113 is programmed to determine what unit price to use. In an embodiment, in response to receiving a product identifier, the accounting service 113 is programmed to query the unit price for a specific dimension for the_current_active pricing id for a (product family+product id) combination of values. Next, the API 112 and accounting service 113 are programmed to determine:

1. Which wallet to charge. The accounting service 113 will have received an Organization ID in an API call but also needs a Wallet ID. Based on the Wallet ID, the accounting service 113 is programmed to determine an applicable currency. In some embodiments, a Wallet ID can differ depending on the workspace associated with a call.

2. The unit price that is associated with the Organization. Based on an event's payload, the accounting service 113 is programmed to translate the inputs to the product family+product+pricing and dimension to determine the unit price. Further, the accounting service 113 is programmed to account for the present Bundle, product context, and any specific overrides.

In an embodiment, accounting service 113 is programmed to execute the following functions in the following scenarios:

3.2.1 SMS Channel to Accounting with Org Bundle Available

In this scenario, an SMS message has been accepted by the flow service 114 or a Channels service, which transmits a call to inform the accounting service 113 about a chargeable event. Assume that a specified Organization has been given special pricing using bundle overrides. The calling service provides the accounting service 113 with an input specifying a channel, organization, workspace, channel attributes, and context such as product name. In response, the accounting service 113 is programmed to execute a wallet lookup and to determine a unit price. In an embodiment, the pricing lookup is executed using a first operation when pricing is overridden in an offer or bundle, to obtain the override pricing; otherwise, it is executed using a second operation to lookup in the pricing itself.

3.2.2 SMS Channel to Accounting with No Org Bundle

In this scenario, an SMS message has been accepted by the flow service 114 or a Channels service, which transmits a call to inform the accounting service 113 about a chargeable event. Assume that the specified Organization has no special pricing using bundle overrides and thus receives standard current pricing for the specified product. The calling service provides the accounting service 113 with an input of the kind previously described, including specifying a destination channel and multiplier.

3.2.3 Inbox+SMS Channel to Accounting with Org Bundle Available

In this scenario, an SMS message has been accepted by the flow service 114 or a Channels service, which transmits a call to inform the accounting service 113 about a chargeable event. The Organization has been given special pricing using a bundle override mechanism. The calling service provides the accounting service 113 with the input that has been previously described but also includes a charge session identifier for an inbox if the inbox did its own charging. In response, the accounting service 113 is programmed to execute a wallet lookup and to determine a unit price. In an embodiment, the pricing lookup is executed using a first operation when pricing is overridden in an offer or bundle to obtain the override pricing; otherwise, it is executed as specified using a second operation to lookup in the pricing itself.

3.2.4 Inbox+SMS Channel to Accounting with Pricing Override in the Bundle

In this scenario, an SMS message has been accepted by the flow service 114 or a Channels service, which transmits a call to inform the accounting service 113 about a chargeable event. The Organization has been given special pricing using the bundle overrides mechanism. The calling service provides the accounting service 113 with input as previously described and also includes an array of product contexts, including at least a product name and data specifying whether the inbox did its own charging. In response, the accounting service 113 is programmed to execute a wallet lookup and to determine a unit price. In an embodiment, the pricing lookup is executed using a first operation when pricing is overridden in an offer or bundle and otherwise using a second operation to lookup the pricing itself. In some cases, accounting service 113 can be programmed to skip the second operation, which would have been to look up pricing; when an override with a unit price is available, there is no need to look up pricing anywhere else.

3.3 Example Method of Using the API

FIG. 6 illustrates a process flow the accounting service can execute to implement a new product setup. For purposes of illustrating a clear example, the description of FIG. 6 assumes that accounting service 113 is programmed to execute the flow of FIG. 6 when a user, such as a product administrator, creates a new public product combination of 'Inbox+Voice-Outbound' where Voice calls are made from Inbox and charged at a discounted rate. The pricing has to be added for calls terminating to 'The Netherlands' from the 'EEA zone' in this example. Other embodiments and other products can use functionally similar steps that are adapted to the requirements or attributes of the particular product. All steps of FIG. 6 are computer-implemented, programmatic steps involving creating or transforming data structures in computer memory or a database and are not intended to represent abstract business operations. The accounting service 113 can execute the flow of FIG. 6 as a pre-processing stage or configuration stage before executing the flow of FIG. 7. For example, the flow of FIG. 6 can be used one or more times to create and activate one or more product families, products, pricings, and dimensions, followed by executing FIG. 7 to evaluate specific messages or message campaigns against the data representing one or more product families, products, pricings, and dimensions to determine specific pricing, costs, or charges for one or more messages in flight, in real-time as the messages are created, entered in the system, dispatched, and pass through message flows.

At block 602, a product family is created by calling a creation function of the API 112 and writing a database access pattern. For example, to create a product family 'Voice' assuming 'Inbox' already exists, the application 105 or an external user application at user computer 106 (FIG. 1A) can be programmed to call a REST API 'POST' to create a product family and write the database access pattern.

At block 604, a product is created in the product family if the product does not exist. For example, application 105 or an external user application at user computer 106 is programmed to call the REST API 'POST' with a repository call to create a product and use database write access to create the new product and update a count of products in the family.

At block 606, pricing for the product is created. For example, application 105 or an external user application at the user computer 106 is programmed to call a pricings function of the API and use database 140 to access a pattern to create pricing and increment a pricing count attribute of the product.

At block 608, a pricing dimension is created. For example, application 105 or an external user application at user computer 106 is programmed to call the API to request pricing dimensions based on a specific pricing identifier and to use database 140 to access a pattern to add a new dimension.

At block 610, the product family is activated. For example, application 105 or an external user application at the user computer 106 is programmed to call the API with a particular database access pattern.

At block 612, the product is activated. For example, application 105 or an external user application at user computer 106 is programmed to call the API REST API with a specified database access pattern.

At block 614, the pricing and dimensions are activated. For example, application 105 or an external user application at user computer 106 is programmed to call the API REST API and to use a specified database access pattern to activate pricing.

In an embodiment, also as part of block 612, accounting service 113 is programmed to scan all pricing dimensions and commence a batch item update. In an embodiment, also as part of block 612, accounting service 113 is programmed to use a database update item pattern to update dimensions in a batch update.

FIG. 7 illustrates an example process flow that the system of FIG. 1A can be programmed to execute to generate charge events in real-time in response to requests to dispatch messages in a high-speed, large-scale message processing system. At block 702, the process is programmed to receive a call or request to dispatch a message via an API or a flow service. For example, accounting service 113 can receive a call from application 105 to API 112 that the API relays to the accounting service, or the accounting service can receive a programmatic call directly from flow service 114 or indirectly via the API.

At block 704, the process is programmed to extract at least a product identifier and organization identifier from the call or request. For example, the orgID and product values of attributes 167 (FIG. 1C) can be obtained via block 704 and via direct extraction from a payload of an API call or programmatic call.

At block 706, based on the organization identifier, the process is programmed to retrieve one or more configuration values from digital data storage, such as the database 140, the main memory of the message application processor 110, or a cache memory. For example, the orgID can be used as a key value to query a configuration table to retrieve a tier value and a currency value for the specified organization, resulting in adding the tier value and currency value to the attributes 167 in memory. The digital data storage can be organized using a table schema or data schema, as shown in FIG. 1C. The digital data storage can comprise a database being communicatively coupled to the message application processor, the product identifier being one of a plurality of different product identifiers, each corresponding to a different electronic digital messaging product of a product family, each of the different product identifiers being associated with at least one pricing, each pricing being associated with one or more dimensions; the database being configured according to a relational table schema that includes tables specifying each of the plurality of different product identifiers, the product family, the pricing, and the one or more dimensions. Further, in one embodiment, the product identifier is one of a plurality of different product identifiers, each corresponding to a different electronic digital messaging product of a product family, each different electronic digital messaging product corresponding to a service of sending a messaging using a particular one of the plurality of different communication channels.

At block 708, based on the product identifier, the process is programmed to retrieve data relating to an applicable bundle from the digital data storage. For example, block 708 can be implemented as a query, using the product identifier as a key, to a bundle table of the database 140 to retrieve a bundle that is defined for the corresponding product, and to retrieve bundle attribute values such as a discount applicable to the bundle. Optionally, the process is programmed to retrieve a product context value based on the product identifier. The product context can be coded as a default value or constant that maps to the product identifier, or retrieved from a configuration file or database table. The product context value can serve as an additional lookup value to determine applicable pricing in subsequent steps and could influence, for example, discounting or the selection of a dimension or pricing. In this manner, block 708 can provide steps of a method in which the message application processor retrieves, based on the product identifier, one or more of the first data specifying a bundle that is associated with the organization identifier and the product identifier and second data specifying a product context that is associated with the product identifier, and updates a price applicable to the message based upon one or more of the first data and the second data.

At block 710, the process is programmed to query a system service to obtain the then-current time at which block 710 is executing. For example, a system clock service, time service, or functionally similar service can be called to obtain the then-current time. Some implementations could have direct programmatic access to a system clock of message application processor 110.

At block 712, based on the product identifier and the current time, the process is programmed to query the digital data storage to retrieve an applicable pricing. The query can be directed to the database 140, for example, and can include a SELECT statement or a functional equivalent that limits the query to records in a result set having an effectivePricingDate value that is earlier than or equal to the current time value that was obtained at block 710, the product identifier, orgId, product context, bundle identifier, and other values among the attributes 167. In response, the database 140 can be programmed to return an applicable pricing 164 that best matches the attributes 167 represented in the query. In this manner, the process is programmed to use as many of the attributes 167, including possibly all of the orgID, product-Context, product, bundleForCustomer, effectivePricingDate, tier, currency, and product_dimension, to determine in real-time a pricing that applies to the call, request, or message of block 702.

The applicable pricing at block 712 can be updated, including applying upcharges or increases, or discounts, based on any of the attributes 167. For example, in one embodiment, each of the one or more dimensions can be associated in the database with a different destination of the message, and the message application processor can be programmed for updating the price applicable to the message based upon applying a first discount value that is associated in the database with a first dimension among the one or more dimensions, the first discount being different than a second discount value that is specified in a second dimension among the one or more dimensions. Other updates can include any of:

1. Each pricing being associated in the database with a different effective date; the message application processor receiving, in response to the querying the digital data storage, based on the product identifier and the time value, a result set of two or more applicable pricings for the message and corresponding to the product identifier; the message application processor filtering the result set based on the time value to remove one or more pricings that are associated with an effective date that is greater than the time value. The database can have a pricing table that is configured to store append-only records of the pricings.

2. The database having a pricing table that stores the pricings and is configured to store append-only records of the pricings, each of the pricings in the pricing table being associated with a version value, each of the pricings in the pricing table being immutable.

3. Storing, in the database, a first product context that associates the product identifier with a second product; storing, in the database, a second product context, that associates the product identifier with a third product; the message application processor retrieving, based on the product identifier, data specifying the first product context; the message application processor updating a price applicable to the message based upon applying a first discount value that is specified in first product context, the first discount being different than a second discount value that is specified in the second product context.

4. The message application processor updating a price applicable to the message by applying a first discount value that is specified in the bundle, the first discount value being different than a second discount value that is specified in a second bundle that is associated with the same product identifier and with a different organization identifier.

At block 714, the process is programmed to create and store a fee charge record based on the applicable pricing. As one example, the process can signal a separate charging service executing in message application processor 110 or hosted in a separate compute instance or computer to create and store a fee charge record based on the applicable pricing. Block 714 can comprise forming and dispatching a programmatic call to a separate charging service that requests creating and storing a digital record of a fee, price, or charge applicable to the call, request, or message of block 702. Or, block 714 can comprise the accounting service 113 directly writing, to a charge table of database 140 or to another table or repository, a charge record representing a fee, price, or charge applicable to the call, request, or message of block 702. Event logging services or message bus services can be used to create and log events corresponding to charges.

In an embodiment, the call or charge record can comprise a transaction identifier, a timestamp value, a price or fee, and all of the orgID, productContext, product, bundleForCustomer, effectivePricingDate, tier, currency, and product_dimension that formed the basis of the charge. In this manner, the call or charge record forms an explainable record of all evidence supporting a particular fee or charge. In an embodiment, the charge table of database 140 or the other table or repository is configured as append-only tables so that the accounting service 113 or charge service only can append charge records and cannot update or delete other existing charge records.

At block 716, the process is programmed to return to a process or service that sent the call or request of block 702, a response or response code corresponding to a message dispatch authorization. The response can be transmitted to flow service 114 or formatted as a response to a call from API 112. The message dispatch authorization comprises a response, response code, or message that authorizes the calling process or service to dispatch the message of block 702 because, at block 716, a pricing determination and charge transaction have been completed successfully. Additionally or alternatively, block 716 can comprise updating a state of the message specified in block 702 to advance to the next state, effectively allowing the message execution unit 118 to move the message to a messaging channel 120, 122, 124.

Block 716 is not required, and some embodiments can execute block 702 to block 714, inclusive, asynchronously with respect to the transmission of messages or further processing of messages using message execution unit 118 or flow service 114. That is, the process of block 702 to block 714 does not need to interrupt message processing or transmission but can occur in parallel or independently.

The process of FIG. 7 thus can be programmed to implement a computer-implemented method, comprising: using a message application processor, programmatically receiving a first request to determine a fee associated with sending a digital electronic message using any one of a plurality of different communication channels, the request comprising at least a product identifier and an organization identifier; in response to the request, the message application processor executing: extracting the product identifier and the organization identifier from the message; based on the organization identifier, retrieving from digital data storage one or more configuration values that are associated with an organization corresponding to the organization identifier; the message application processor obtaining a time value corresponding to a then-current time; the message application processor querying the digital data storage, based on the product identifier and the time value, an applicable pricing for the message and corresponding to the product identifier and the time value; the message application processor causing digitally creating and storing a fee charge record based on the applicable pricing.

A fully deployed implementation with hundreds of organizations enrolled, dozens to hundreds of products, and dozens of dimensions per product, requires real-time reading, evaluation, and decision concerning thousands to millions of records, while messages via SMS, MMS, WHATSAPP, FACEBOOK MESSENGER, WEIXIN/WECHAT, QQ, TELEGRAM, SNAPCHAT, SLACK, SIGNAL, SKYPE, DISCORD, VIBER have been created, referenced in a call, and are awaiting dispatch or state changes. Organizations and users of developer computer 102 or user computer 106 will not tolerate multi-second to minutes-long delays in assessing data of this volume, and near-instant processing is required to operate a practical system at the scale of thousands to millions of messages per second. In an embodiment, the process of FIG. 7 executes using high-speed compute instances and storage instances to enable executing all of block 702 to block 714 inclusive on a real-time basis as the message application processor 110 processes thousands to millions of messages per second. In one specific embodiment, the process of FIG. 7 is programmed and optimized and implemented using compute instances and storage instances to complete executing all of block 702 to block 714 inclusive within about 5 milliseconds (ms) to 200 ms per message on a continuous basis.

Embodiments thus provide a distributed computer system that implements a large-scale message processing system that can initiate, request sending, and monitor the transmission of messages using any of a plurality of different communication channels that are independent of the system. Different users, entities, or enterprises, including those having a customer relationship with an owner or operator of the message processing system, operate independent applications that can call the message processing system to request the system to originate or publish messages on any one or more of the channels. The messaging system defines different products, and product pricing, using digitally stored data structures in a high-speed database. As an enterprise requests the system to dispatch messages, the system automatically determines, at wire-speed or message-speed and thus typically in times ranging from a few milliseconds (ms) to 250 ms, which data structures, attributes, and values apply to the enterprise and the message and writes a pricing record to a database for future use in invoicing or charging.

In one embodiment, the disclosure defines methods, programmatic functions, and means of calling the functions and methods, typically using an application programming interface (API), that provide the programmatic ability to define messaging products and group them into product families; the ability to create price definitions or "pricings" for products, including pricings that can be effective on a future date or activated later, so that an effective date of a pricing is considered at the time of a lookup, and pricings that are versioned and cannot be changed once active; the ability to create different pricing depending on a combination or context of a product; the ability to provide special pricing to major customers, create custom product bundles, and to create custom pricings that are attached to products in the bundle; the ability to determine the price of a product and its units subject to a fee or charge based on one or more of: organization identifier or orgId, product context; product (for example, SMS); a bundle identifier; an effective date; a tier value representing a magnitude or volume of usage, alone or in conjunction with metering; currency; product dimension, such as the destination for an SMS message or the combination of source and destination for voice data. Embodiments are message-type agnostic and thus can be used with SMS messaging, voice calling, voice messaging, email transfer, and messaging using applications, apps, or platforms other than SMS, through similar calls, objects, formats, processes, and operations.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 500 includes an input/output (I/O) subsystem 502, which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage devices coupled to I/O subsystem 502 for storing information and instructions for processor 504. The ROM 508 may include various forms of programmable ROM (PROM), such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disks such as CD-ROM or DVD-ROM and may be coupled to I/O subsystem 502 for storing information and instructions. Storage 510 is an example of a non-transitory computer-readable medium that may be used to store instructions and data which, when executed by the processor 504, cause performing computer-implemented methods to execute the techniques herein.

The instructions in memory 506, ROM 508, or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touchscreen display or a light-emitting diode (LED) display or a liquid crystal display (LCD), or an e-paper display. Computer system 500 may include other types of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on an output device 512 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server computer 530.

Computer system 500 may implement the techniques described herein using customized hard-wired logic, at least one ASIC or FPGA, firmware, and/or program instructions or logic which, when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal, and appropriate circuitry can provide the data to I/O subsystem 502, such as placing the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to I/O subsystem 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a worldwide packet data communication network represented as Internet 528. A server computer 530 may be coupled to Internet 528. Server computer 530 broadly represents any computer, data center, virtual machine, or virtual computing instance with or without a hypervisor or computer executing a containerized program system such as DOCKER or KUBERNETES. Server computer 530 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 500 and server computer 530 may form elements of a distributed computing system that includes other computers, a processing cluster, server farm or other organization of computers that cooperate to perform tasks or execute applications or services. Server computer 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 530 may comprise a web application server that hosts a presentation layer, application layer, and data storage layer, such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server computer 530 might transmit a requested code for an application program through Internet 528, ISP 526, local network 522, and communication interface 518. The received code may be executed by processor 504 as it is received and/or stored in storage 510 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   using a message application processor, programmatically receiving a first request to determine a fee associated with sending a digital electronic message using any one of a plurality of different communication channels, the first request comprising at least a product identifier and an organization identifier;
   in response to the first request, the message application processor executing: extracting the product identifier and the organization identifier from the message; based on the organization identifier, retrieving from digital data storage one or more configuration values that are associated with an organization corresponding to the organization identifier;
   the message application processor obtaining a time value corresponding to a then-current time;
   the message application processor querying the digital data storage, based on the product identifier and the time value, an applicable pricing for the message and corresponding to the product identifier and the time value;
   the message application processor causing digitally creating and storing a fee charge record based on the applicable pricing.

2. The computer-implemented method of claim 1, further comprising the message application processor signaling a charging service to create and store a fee charge event based on the applicable pricing.

3. The computer-implemented method of claim 1, further comprising:
   the message application processor retrieving, based on the product identifier, one or more of first data specifying a bundle that is associated with the organization identifier and the product identifier and second data specifying a product context that is associated with the product identifier;

the message application processor updating a price applicable to the first message based upon one or more of the first data and the second data.

4. The computer-implemented method of claim 1, further comprising:

a database being communicatively coupled to the message application processor;

the product identifier being one of a plurality of different product identifiers each corresponding to a different electronic digital messaging product of a product family, each of the different product identifiers being associated with at least one pricing, each pricing being associated with one or more dimensions;

the database being configured according to a relational table schema that includes tables specifying each of the plurality of different product identifiers, the product family, the pricing, and the one or more dimensions.

5. The computer-implemented method of claim 1, further comprising the message application processor executing all of claim 1 in real-time for the message and each other message among thousands to millions of messages per second.

6. The computer-implemented method of claim 1, further comprising the message application processor executing all of claim 1 within 5 ms to 250 ms for the message, and processing from thousands to millions of other electronic messages per second using the steps of claim 1 within 5 ms to 250 ms for each of the other electronic messages.

7. The computer-implemented method of claim 1, the plurality of different communication channels comprising two or more of SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER.

8. The computer-implemented method of claim 1, further comprising:

a database being communicatively coupled to the message application processor;

the plurality of different communication channels comprising two or more of SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER;

the product identifier being one of a plurality of different product identifiers each corresponding to a different electronic digital messaging product of a product family, each different electronic digital messaging product corresponding to a service of sending a messaging using a particular one of the plurality of different communication channels, each of the different product identifiers being associated with at least one pricing, each pricing being associated with one or more dimensions;

the database being configured according to a relational table schema that includes tables specifying each of the plurality of different product identifiers, the product family, the pricing, and the one or more dimensions.

9. The computer-implemented method of claim 8, each of the one or more dimensions being associated in the database with a different destination of the message, the method further comprising the message application processor updating the price applicable to the message based upon applying a first discount value that is associated in the database with a first dimension among the one or more dimensions, the first discount being different than a second discount value that is specified in a second dimension among the one or more dimensions.

10. The computer-implemented method of claim 1, further comprising:

each pricing being associated in a database with a different effective date;

the message application processor receiving, in response to the querying the digital data storage, based on the product identifier and the time value, a result set of two or more applicable pricings for the message and corresponding to the product identifier;

the message application processor filtering the result set based on the time value to remove one or more pricings that are associated with an effective date that is greater than the time value.

11. The computer-implemented method of claim 10, the database having a pricing table that is configured to store append-only records of the pricings.

12. The computer-implemented method of claim 4, the database having a pricing table that stores the pricings and is configured to store append-only records of the pricings, each of the pricings in the pricing table being associated with a version value, each of the pricings in the pricing table being immutable.

13. The computer-implemented method of claim 4, further comprising:

storing, in the database, a first product context that associates the product identifier with a second product;

storing, in the database, a second product context, that associates the product identifier with a third product;

the message application processor retrieving, based on the product identifier, data specifying the first product context;

the message application processor updating a price applicable to the message based upon applying a first discount value that is specified in first product context, the first discount being different than a second discount value that is specified in the second product context.

14. The computer-implemented method of claim 3, further comprising the message application processor updating a price applicable to the message by applying a first discount value that is specified in the bundle, the first discount value being different than a second discount value that is specified in a second bundle that is associated with the same product identifier and with a different organization identifier.

15. One or more non-transitory computer-readable storage media storing one or more sequences of instructions which, when executed using one or more hardware processors of a message application processor cause the message application processor to perform:

using a message application processor, programmatically receiving a first request to determine a fee associated with sending a digital electronic message using any one of a plurality of different communication channels, the request comprising at least a product identifier and an organization identifier;

in response to the request, the message application processor executing: extracting the product identifier and the organization identifier from the message; based on the organization identifier, retrieving from digital data storage one or more configuration values that are associated with an organization corresponding to the organization identifier;

the message application processor obtaining a time value corresponding to a then-current time;

the message application processor querying the digital data storage, based on the product identifier and the time value, an applicable pricing for the message and corresponding to the product identifier and the time value;

the message application processor causing digitally creating and storing a fee charge record based on the applicable pricing.

16. The one or more non-transitory computer-readable storage media of claim 15, further comprising sequences of instructions which when executed by the message application processor cause the message application processor to execute: signaling a charging service to create and store a fee charge event based on the applicable pricing.

17. The one or more non-transitory computer-readable storage media of claim 15, further comprising sequences of instructions which when executed by the message application processor cause the message application processor to execute:

retrieving, based on the product identifier, one or more of first data specifying a bundle that is associated with the organization identifier and the product identifier and second data specifying a product context that is associated with the product identifier;

updating a price applicable to the message based upon one or more of the first data and the second data.

18. The one or more non-transitory computer-readable storage media of claim 15, further comprising:

a database being communicatively coupled to the message application processor;

the product identifier being one of a plurality of different product identifiers each corresponding to a different electronic digital messaging product of a product family, each of the different product identifiers being associated with at least one pricing, each pricing being associated with one or more dimensions;

the database being configured according to a relational table schema that includes tables specifying each of the plurality of different product identifiers, the product family, the pricing, and the one or more dimensions.

19. The one or more non-transitory computer-readable storage media of claim 15, further comprising sequences of instructions which when executed by the message application processor cause the message application processor to execute all of claim 15 in real-time for the message and each other message among thousands to millions of messages per second.

20. The one or more non-transitory computer-readable storage media of claim 15, further comprising sequences of instructions which when executed by the message application processor cause the message application processor to execute all of claim 15 within 5 ms to 250 ms for the message, and processing from thousands to millions of other electronic messages per second using the steps of claim 1 within 5 ms to 250 ms for each of the other electronic messages.

21. The one or more non-transitory computer-readable storage media of claim 15, the plurality of different communication channels comprising two or more of SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER.

22. The one or more non-transitory computer-readable storage media of claim 15, further comprising:

a database being communicatively coupled to the message application processor;

the plurality of different communication channels comprising two or more of SMS; MMS; WHATSAPP; FACEBOOK MESSENGER; WEIXIN/WECHAT; QQ; TELEGRAM; SNAPCHAT; SLACK; SIGNAL; SKYPE; DISCORD; VIBER;

the product identifier being one of a plurality of different product identifiers each corresponding to a different electronic digital messaging product of a product family, each different electronic digital messaging product corresponding to a service of sending a messaging using a particular one of the plurality of different communication channels, each of the different product identifiers being associated with at least one pricing, each pricing being associated with one or more dimensions;

the database being configured according to a relational table schema that includes tables specifying each of the plurality of different product identifiers, the product family, the pricing, and the one or more dimensions.

23. The one or more non-transitory computer-readable storage media of claim 22, each of the one or more dimensions being associated in the database with a different destination of the message, the storage media further comprising sequences of instructions which when executed by the message application processor cause the message application processor to execute: updating the price applicable to the message based upon applying a first discount value that is associated in the database with a first dimension among the one or more dimensions, the first discount being different than a second discount value that is specified in a second dimension among the one or more dimensions.

24. The one or more non-transitory computer-readable storage media of claim 15, each pricing being associated in a database with a different effective date, and further comprising sequences of instructions which when executed by the message application processor cause the message application processor to execute:

receiving, in response to the querying the digital data storage, based on the product identifier and the time value, a result set of two or more applicable pricings for the message and corresponding to the product identifier;

filtering the result set based on the time value to remove one or more pricings that are associated with an effective date that is greater than the time value.

25. The one or more non-transitory computer-readable storage media of claim 24, the database having a pricing table that is configured to store append-only records of the pricings.

26. The one or more non-transitory computer-readable storage media of claim 18, the database having a pricing table that stores the pricings and is configured to store append-only records of the pricings, each of the pricings in the pricing table being associated with a version value, each of the pricings in the pricing table being immutable.

27. The one or more non-transitory computer-readable storage media of claim 18, further comprising sequences of instructions which when executed by the message application processor cause the message application processor to execute:

storing, in the database, a first product context that associates the product identifier with a second product;

storing, in the database, a second product context, that associates the product identifier with a third product;

the message application processor retrieving, based on the product identifier, data specifying the first product context;

the message application processor updating a price applicable to the message based upon applying a first discount value that is specified in first product context, the first discount being different than a second discount value that is specified in the second product context.

28. The one or more non-transitory computer-readable storage media of claim 17, further comprising sequences of instructions which when executed by the message application processor cause the message application processor to execute: updating a price applicable to the message by applying a first discount value that is specified in the bundle, the first discount value being different than a second discount value that is specified in a second bundle that is associated with the same product identifier and with a different organization identifier.

* * * * *